United States Patent
Zhao et al.

(10) Patent No.: US 11,240,443 B2
(45) Date of Patent: Feb. 1, 2022

(54) SYSTEMS AND METHODS FOR IMAGE ACQUISITION

(71) Applicant: ZHEJIANG DAHUA TECHNOLOGY CO., LTD., Zhejiang (CN)

(72) Inventors: Jun Zhao, Hangzhou (CN); Yiyi Shao, Hangzhou (CN); Guangyue Shen, Hangzhou (CN); Jianhua Zhan, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/326,290

(22) Filed: May 20, 2021

(65) Prior Publication Data
US 2021/0329159 A1 Oct. 21, 2021

Related U.S. Application Data

(63) Continuation of application No. PCT/CN2019/093781, filed on Jun. 28, 2019.

(30) Foreign Application Priority Data

Dec. 10, 2018 (CN) .......................... 201811504339.X

(51) Int. Cl.
*H04N 5/235* (2006.01)
*H04N 5/33* (2006.01)

(52) U.S. Cl.
CPC ......... *H04N 5/2355* (2013.01); *H04N 5/2351* (2013.01); *H04N 5/33* (2013.01)

(58) Field of Classification Search
CPC ...... H04N 5/2355; H04N 5/2351; H04N 5/33; H04N 5/2258; G02B 17/08; G02B 17/008
(Continued)

(56) References Cited

U.S. PATENT DOCUMENTS

| 8,755,597 B1 | 6/2014 | Tantalo et al. |
| 2014/0152686 A1 | 6/2014 | Narasimha et al. |

(Continued)

FOREIGN PATENT DOCUMENTS

| CN | 101888487 A | 11/2010 |
| CN | 201869309 U | 6/2011 |

(Continued)

OTHER PUBLICATIONS

International Search Report in PCT/CN2019/093781 dated Sep. 11, 2019, 4 pages.

(Continued)

*Primary Examiner* — Yogesh K Aggarwal
(74) *Attorney, Agent, or Firm* — Metis IP LLC

(57) ABSTRACT

A system is provided in the present disclosure. The system may determine a first exposure time of a visible light sensor of an image acquisition device according to ambient light at a scene to be photographed. The image acquisition device may include the visible light sensor and an infrared light sensor. The system may also actuate the image acquisition device to simultaneously capture a visible light image and at least one infrared light image of the scene. The visible light image may be captured using a visible light sensor with the first exposure time. The at least one infrared light image may be captured using an infrared light sensor. The system may also generate a WDR image by processing the at least one infrared light image, and generate a target image of the scene by fusing the visible light image and the WDR image.

20 Claims, 6 Drawing Sheets

(58) Field of Classification Search
USPC .......................................... 348/223.1–229.1
See application file for complete search history.

(56) References Cited

U.S. PATENT DOCUMENTS

| | | |
|---|---|---|
| 2014/0285672 A1 | 9/2014 | Högasten et al. |
| 2015/0009362 A1 | 1/2015 | Venkataraman et al. |
| 2016/0065865 A1 | 3/2016 | Shiokawa et al. |
| 2017/0330053 A1 | 11/2017 | Park et al. |
| 2018/0069996 A1 | 3/2018 | Shukla et al. |
| 2019/0228512 A1* | 7/2019 | Kurihara ................ H04N 9/78 |

FOREIGN PATENT DOCUMENTS

| | | |
|---|---|---|
| CN | 202121687 U | 1/2012 |
| CN | 106060418 A | 10/2016 |
| CN | 107302667 A | 10/2017 |
| CN | 107623831 A | 1/2018 |
| CN | 108090886 A | 5/2018 |
| CN | 108377335 A | 6/2018 |

OTHER PUBLICATIONS

Written Opinion in PCT/CN2019/093781 dated Sep. 11, 2019, 4 pages.
First Office Action in Chinese Application No. 201811504339.X dated Mar. 26, 2020, 15 pages.
The Extended European Search Report in European Application No. 19894941.4 dated Nov. 25, 2021, 8 pages.

* cited by examiner

200

500

| Determining a first exposure time of a visible light sensor of an image acquisition device according to ambient light at a scene to be photographed, the image acquisition device including the visible light sensor and an infrared light sensor | ~ 501 |

| Actuating the image acquisition device to simultaneously capture a visible light image and at least one infrared light image of the scene, wherein the visible light image is captured using the visible light sensor with the first exposure time, and the at least one infrared light image is captured using the infrared light sensor | ~ 502 |

| Generating a wide dynamic range (WDR) image by processing the at least one infrared light image | ~ 503 |

| Generating a target image of the scene by fusing the visible light image and the WDR image | ~ 504 |

FIG. 5

SYSTEMS AND METHODS FOR IMAGE ACQUISITION

CROSS-REFERENCE TO RELATED APPLICATIONS

This application is a continuation of International Patent Application No. PCT/CN2019/093781, filed on Jun. 28, 2019, which claims priority to Chinese Patent Application No. 201811504339.X, filed on Dec. 10, 2018, the contents of each of which are hereby incorporated by reference.

TECHNICAL FIELD

The present application generally relates to image acquisition technology, and more particularly, to systems, methods, and computer storage media for acquiring an image using an image acquisition device having a visible light sensor and an infrared light sensor.

BACKGROUND

Multi-channel image acquisition devices (e.g., cameras) are widely used in various fields, such as photography, filming, and safety monitoring. A multi-channel image acquisition device normally has a visible light sensor and an infrared light sensor for capturing image data of a scene simultaneously. The image data collected by the visible light sensor and the infrared light sensor may need to be fused to generate a target image of the scene. The imaging quality of the target image may be affected by an imaging scenario. For example, the target image may be unclear in some imaging scenarios (e.g., at night, in a dark environment, on a foggy day). Therefore, it is desirable to provide effective systems and methods for generating a target image using an image acquisition device having a visible light sensor and an infrared light sensor, thereby improving imaging quality.

SUMMARY

According to one aspect of the present disclosure, an imaging acquisition system is provided. The system may include an image acquisition device including a visible light sensor for sensing visible light and an infrared light sensor for sensing infrared light, at least one storage medium storing a set of instructions, and at least one processor in communication with the at least one storage medium and the image acquisition device. When executing the instructions, the at least one processor may be configured to direct the system to perform the following operations. The at least one processor may be configured to direct the system to determine a first exposure time of the visible light sensor according to ambient light at a scene to be photographed. The at least one processor may also be configured to direct the system to actuate the image acquisition device to simultaneously capture a visible light image and at least one infrared light image of the scene. The visible light image may be captured using the visible light sensor with the first exposure time, and the at least one infrared light image may be captured using the infrared light sensor. The at least one processor may be further configured to direct the system to generate a wide dynamic range (WDR) image by processing the at least one infrared light image, and generate a target image of the scene by fusing the visible light image and the WDR image.

In some embodiments, the at least one infrared light image may be one infrared light image. To generate the WDR image by processing the infrared light image, the at least one processor may be further configured to direct the system to determine a dynamic range of the infrared light image, and determine whether the dynamic range satisfies a predetermined condition. Upon a determination that the dynamic range satisfies the predetermined condition, the at least one processor may be configured to direct the system to generate the WDR image by processing the infrared light image.

In some embodiments, upon a determination that the dynamic range does not satisfy a predetermined condition, the at least one processor may be configured to direct the system to designate the infrared light image as the WDR image.

In some embodiments, the at least one infrared light image may include at least two infrared light images. The at least two infrared light images may be captured using the infrared light sensor with at least two different second exposure times. To generate the WDR image by processing the at least two infrared light images, the at least one processor may be further configured to direct the system to generate the WDR image by combining the at least two infrared light images.

In some embodiments, to determine the first exposure time of the visible light sensor according to the ambient light at the scene to be photographed, the at least one processor may be further configured to direct the system to obtain one or more operation values of one or more exposure parameters of the image acquisition device, and determine a brightness of the ambient light based on at least one of the one or more operation values of the one or more exposure parameters. The at least one processor may be further configured to direct the system to determine the first exposure time of the visible light sensor based on the brightness of the ambient light.

In some embodiments, to generate the target image of the scene by fusing the visible light image and the WDR image, the at least one processor may be further configured to direct the system to divide the visible light image into a plurality of first blocks. The at least one processor may be further configured to direct the system to divide the WDR image into a plurality of second blocks, and compare the plurality of first blocks and the plurality of second blocks to generate a comparison result. The at least one processor may be further configured to direct the system to fuse the visible light image and the WDR image based on the comparison result.

In some embodiments, to generate the target image of the scene by fusing the visible light image and the WDR image, the at least one processor may be further configured to direct the system to determine one or more fusing parameters based on the visible light image and the WDR image, and generate the target image of the scene by fusing the visible light image and the WDR image according to the one or more fusing parameters.

In some embodiments, to generate a target image of the scene by fusing the visible light image and the WDR image, the at least one processor may be further configured to direct the system to preprocess the visible light image and the WDR image, and generate the target image of the scene by fusing the preprocessed visible light image and the preprocessed WDR image.

In some embodiments, the preprocessing of the visible light image and the WDR image may include at least one of an image registration, an image denoising, a bright light suppression, an image compensation, an image segmentation, a color enhancement, a shadow elimination, an image filtering, or an image correction.

According to another aspect of the present disclosure, a method for image acquisition using an image acquisition device is provided. The image acquisition device may include a visible light sensor for sensing visible light and an infrared light sensor for sensing infrared light. The method may include determining a first exposure time of the visible light sensor according to ambient light at a scene to be photographed. The method may include actuating the image acquisition device to simultaneously capture a visible light image and at least one infrared light image of the scene. The visible light image may be captured using the visible light sensor with the first exposure time, and the at least one infrared light image may be captured using the infrared light sensor. The method may also include generating a WDR image by processing the at least one infrared light image, and generating a target image of the scene by fusing the visible light image and the WDR image.

According to another aspect of the present disclosure, a non-transitory computer-readable storage medium including instructions is provided. When accessed by at least one processor of a computing device, the instructions causes the computing device to perform a method. The method may include determining a first exposure time of a visible light sensor of an imaging acquisition device according to ambient light at a scene to be photographed. The image acquisition device may include the visible light sensor for sensing visible light and an infrared light sensor for sensing infrared light. The method may include actuating the image acquisition device to simultaneously capture a visible light image and at least one infrared light image of the scene. The visible light image may be captured using the visible light sensor with the first exposure time, and the at least one infrared light image may be captured using the infrared light sensor. The method may also include generating a WDR image by processing the at least one infrared light image, and generating a target image of the scene by fusing the visible light image and the WDR image.

According to still another aspect of the present disclosure, a system for image acquisition is provided. The system may include a determination module, an actuation module, a WDR image generation module, and a target image generation module. The determination module may be configured to determine a first exposure time of a visible light sensor of an image acquisition device according to ambient light at a scene to be photographed. The image acquisition device may include the visible light sensor for sensing visible light and an infrared light sensor for sensing infrared light. The actuation module may be configured to actuate the image acquisition device to simultaneously capture a visible light image and at least one infrared light image of the scene. The visible light image may be captured using the visible light sensor with the first exposure time, and the at least one infrared light image may be captured using the infrared light sensor. The WDR image generation module may be configured to generate a WDR image by processing the at least one infrared light image. The target image generation module may be configured to generate a target image of the scene by fusing the visible light image and the WDR image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart of an exemplary process for generating a target image of a scene according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
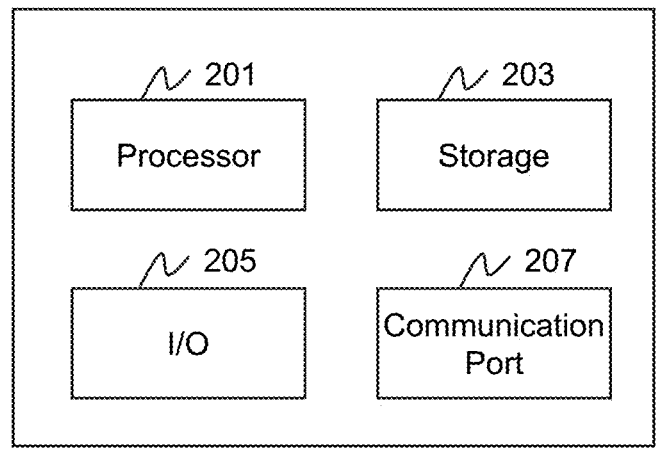
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to systems and methods for image acquisition using an image acquisition device. The image acquisition device may include a visible light sensor for sensing visible light and an infrared light sensor for sensing infrared light. The systems and methods may determine a first exposure time of the visible light sensor according to ambient light at a scene to be photographed. The systems and methods may also actuate the image acquisition device to simultaneously capture a visible light image and at least one infrared light image of the scene, wherein the visible light image may be captured using the visible light sensor with the first exposure time, and the at least one infrared light image may be captured using the infrared light sensor. The systems and methods may further generate a WDR image by processing the at least one infrared light image, and generate a target image of the scene by fusing the visible light image and the WDR image.

According to some embodiments of the present disclosure, the visible light sensor and the infrared light sensor may be used to capture image data of the scene simultaneously, and both the image data captured by the visible light sensor and the infrared light sensor may be used to generate the target image of the scene. In some imaging scenarios, for example, when at night or in a dark imaging scenario, the visible light image captured by the visible light sensor may have limited information (e.g., brightness information, color information) related to the scene. The first exposure time of the visible light sensor may be determined based on the ambient light of the scene, so as to improve the quality of the visible light image and also avoid a smear in the visible light image. In addition, the at least one infrared light image may be subject to WDR processing to generate the WDR image whose wide range satisfies a predetermined condition (e.g., in a specific range, greater than a predetermined threshold). In this way, the imaging quality of the target image, which is generated based on the visible light image and the WDR image, may be improved.

Figure 1:
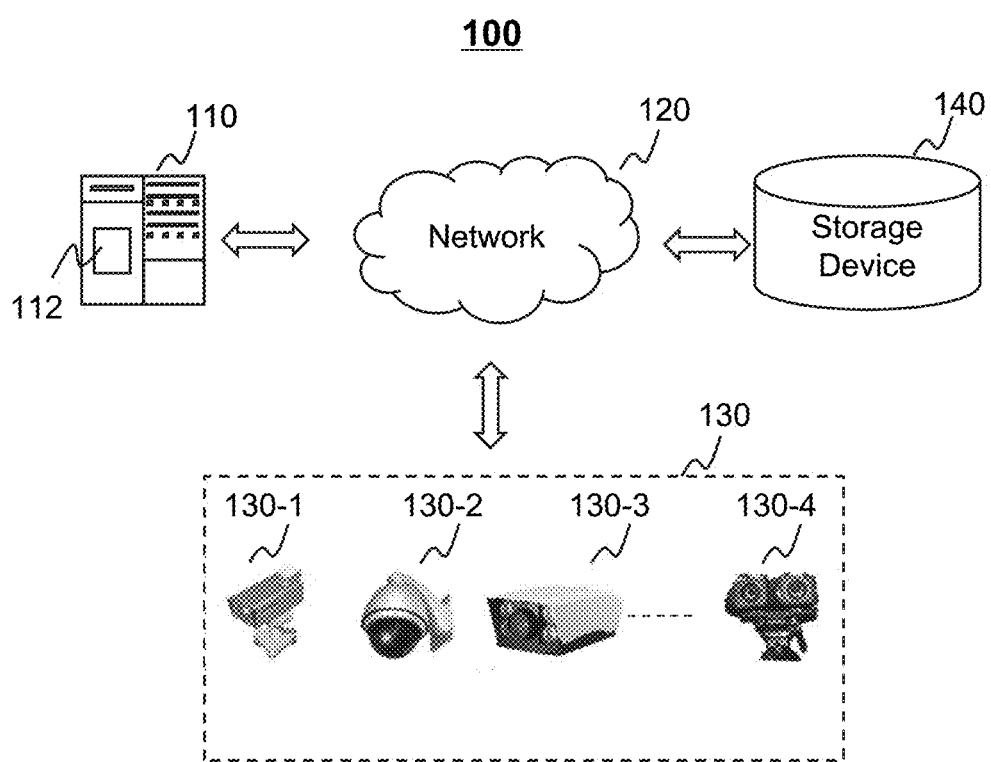
FIG. 1 is a schematic diagram of an exemplary image acquisition system according to some embodiments of the present disclosure.

FIG. 1 illustrates a schematic diagram of an exemplary image acquisition system according to some embodiments of the present disclosure. As shown, the image acquisition system 100 may include a server 110, a network 120, an image acquisition device 130, and a storage device 140. The image acquisition system 100 may be used in various fields including, for example, photography, filming, monitoring, and detection.

The server 110 may process information and/or data relating to the image acquisition system 100 to perform one or more functions described in the present disclosure. For example, the server 110 may process image data of a scene acquired by the image acquisition device 130 to generate a target image of the scene. The server 110 may be a single server or a server group. The server group may be centralized, or distributed (e.g., the server 110 may be a distributed system). In some embodiments, the server 110 may be local or remote. For example, the server 110 may access information and/or data stored in the image acquisition device 130, and/or the storage device 140 via the network 120. As another example, the server 110 may be directly connected to the image acquisition device 130 and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 (or a portion thereof) may be implemented on a computing device 200 having one or more components illustrated in FIG. 2 of the present disclosure.

In some embodiments, the server 110 may include a processing device 112. According to some embodiments of the present disclosure, the processing device 112 may process information and/or data related to the image acquisition system 100 to perform one or more functions described in the present disclosure. For example, the image acquisition device 130 may include a visible light sensor and an infrared light sensor. The processing device 112 may process operation information (e.g., a shutter speed, an aperture size, a gain) related to the image acquisition device 130 to determine an exposure time of the visible light sensor. Additionally or alternatively, the processing device 112 may generate a target image of a scene based on image data of the scene acquired by the visible light sensor and the infrared light sensor.

In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may include any suitable network that can facilitate exchange of information and/or data for the image acquisition system 100. In some embodiments, one or more components in the image acquisition system 100 (e.g., the server 110, the image acquisition device 130, and the storage device 140) may send information and/or data to another component(s) in the image acquisition system 100 via the network 120. For example, the server 110 may obtain an image from the image acquisition device 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The image acquisition device 130 may be and/or include any suitable device that is capable of acquiring image data. Exemplary image acquisition device 130 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 130 may include a gun camera 130-1, a dome camera 130-2, an integrated camera 130-3, a binocular camera 130-4, a monocular camera, etc. In some embodiments, the image acquisition device 130 may include a visible light sensor for sensing visible light and an infrared light sensor for sensing infrared light. The visible light sensor and the infrared light sensor may be used to acquire image data of a scene simultaneously in a certain imaging scenario (e.g., when at night, in a dark environment, in a foggy day). In some embodiments, the image data acquired by the visible light sensor and the infrared light sensor may be processed and combined to generate a target image of the scene.

The image data acquired by the image acquisition device 130 may include an image, or any data about an image, such as values of one or more pixels (or referred to as pixel values) of an image (e.g., luma, gray values, intensities, chrominance, contrast of one or more pixels of an image), RGB data, audio information, timing information, location data, etc. In some embodiments, the image acquisition device 130 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image data acquired by the image acquisition device 130 may be displayed on a terminal device (not shown in FIG. 1). The terminal device may include a tablet computer, a laptop computer, a mobile phone, a personal digital assistance (PDA), a smart watch, a point of sale (POS) device, a virtual reality (VR), an augmented reality (AR), an onboard computer, an onboard television, a wearable device, or the like, or any combination thereof.

The storage device 140 may store data and/or instructions. The data and/or instructions may be obtained from, for example, the server 110, the image acquisition device 130, and/or any other component of the image acquisition system 100. For example, the storage device 140 may store image data acquired by the image acquisition device 130 and/or one or more target images generated by the processing device 112. In some embodiments, the storage device 140 may store data and/or instructions that the server 110 (e.g., the processing device 112) may execute or use to perform exemplary methods described in the present disclosure. In some embodiments, the storage device 140 may include a mass storage device, a removable storage device, a volatile read-and-write memory, a read-only memory (ROM), or the like, or any combination thereof. Exemplary mass storage devices may include a magnetic disk, an optical disk, a solid-state drives, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the image acquisition system 100 (e.g., the server 110, the image acquisition device 130, etc.). One or more components of the image acquisition system 100 may access the data or instructions stored in the storage device 140 via the network 120. In some embodiments, the storage device 140 may be directly connected to or communicate with one or more components of the image acquisition system 100 (e.g., the server 110, the image acquisition device 130, etc.). In some embodiments, the storage device 140 may be part of the server 110 or the image acquisition device 130.

In some embodiments, one or more components of the image acquisition system 100 (e.g., the server 110, the image acquisition device 130, etc.) may have a permission to access the storage device 140. In some embodiments, one or more components of the image acquisition system 100 may read and/or modify information stored in the storage device 140 when one or more conditions are met.

It should be noted that the above description is merely provided for the purposes of illustration, and not intended to limit the scope of the present disclosure. For persons having ordinary skills in the art, multiple variations and modifications may be made under the teachings of the present disclosure. For example, the image acquisition system 100 may include one or more terminal devices. As another example, the processing device 112 may be integrated into the image acquisition device 130. However, those variations and modifications do not depart from the scope of the present disclosure.

FIG. 2 is a schematic diagram illustrating exemplary hardware and/or software components of a computing device 200 according to some embodiments of the present disclosure. The computing device 200 may be used to implement any component of the image acquisition system 100 as described herein. For example, the server 110 (e.g., the processing device 112) and/or the image acquisition device 130 may be implemented on the computing device 200, via its hardware, software program, firmware, or a combination thereof. Although only one such computing device is shown, for convenience, the computer functions relating to the image acquisition system 100 as described herein may be implemented in a distributed fashion on a number of similar platforms, to distribute the processing load.

As illustrated in FIG. 2, the computing device 200 may include a processor 201, a storage 203, an input/output (I/O) 205, and a communication port 207. The processor 201 may execute computer instructions (e.g., program code) and perform functions of the image acquisition system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may determine generate a target image of a scene based on image data of the scene acquired by the image acquisition device 130. In some embodiments, the processor 201 may include interface circuits and processing circuits therein. The interface circuits may be configured to receive electronic signals from the communication port 207, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the communication port 207.

In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 of the present disclosure may also include multiple processors, and thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from the server 110, the image acquisition device 130, and/or any other component of the image acquisition system 100. In some embodiments, the storage 203 may include a mass storage device, a removable storage device, a volatile read-and-write memory, a read-only memory (ROM), or the like, or any combination thereof. For example, the mass storage device may include a magnetic disk, an optical disk, solid-state drives, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for generating a target image of a scene according to image data acquired the image acquisition device 130.

The I/O 205 may input and/or output signals, data, information, etc. In some embodiments, the I/O 205 may enable a user interaction with the computing device 200. In some embodiments, the I/O 205 may include or communicate with an input device and an output device to facilitate communication between the computing device 200 and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the computing device 200 and one or more other components of the image acquisition system 100 or an external source. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port.

Figure 3:
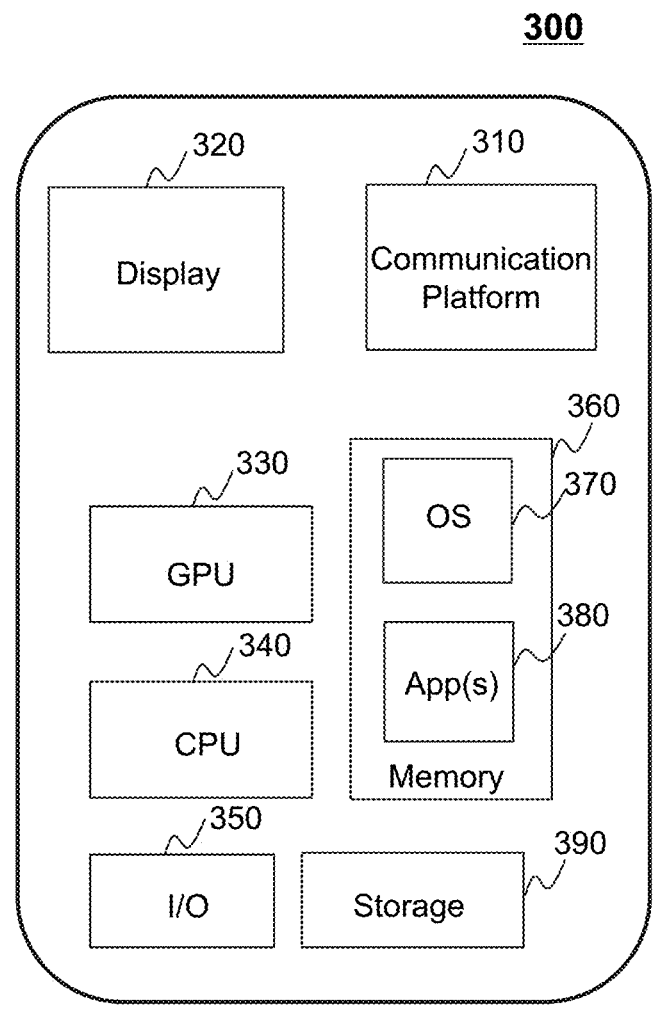
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal device not shown in figures, the processing device 112, and/or the image acquisition device 130) of the image acquisition system 100 may be implemented on the mobile device 300.

As illustrated in FIG. 3, the mobile device 300 may include a communication port 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the image acquisition system 100. User interactions with the information stream may be achieved via the I/O 350 and provided to the image acquisition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
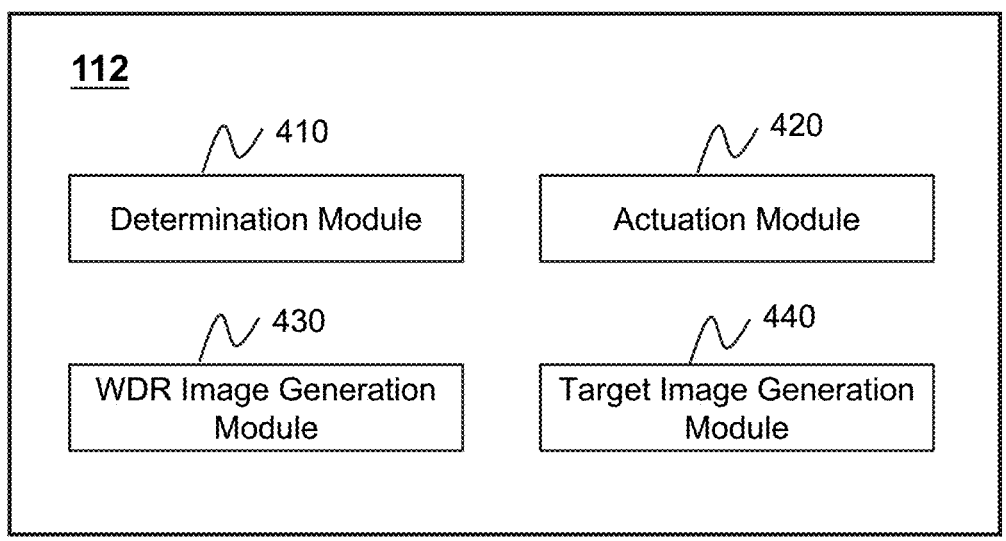
FIG. 4 is a block diagram illustrating an exemplary processing device according to some embodiments of the present disclosure.

FIG. 4 is a block diagram illustrating an exemplary processing device 112 according to some embodiments of the present disclosure. As shown in FIG. 4, the processing device 112 may include a determination module 410, an actuation module 420, a WDR image generation module 430, and a target image generation module 440.

The determination module 410 may be configured to determine a first exposure time of a visible light sensor of an image acquisition device (e.g., the image acquisition device 130) according to ambient light at a scene to be photographed. The image acquisition device may include the visible light sensor and an infrared sensor. In some embodiments, the determination module 410 may determine a brightness of the ambient light based on one or more operation values of one or more exposure parameters of the image acquisition device 130. The determination module 410 may further determine the first exposure time based on the brightness of the ambient light. More descriptions regarding the determination of the first exposure time may be found elsewhere in the present disclosure. See, e.g., operation 501 in FIG. 5 and FIG. 6 and relevant descriptions thereof. In some embodiments, the determination module 410 may also be referred to as an adjustment module.

The actuation module 420 may be configured to actuate the image acquisition device to simultaneously capture a visible light image and at least one infrared light image of the scene, wherein the visible light image may be captured using the visible light sensor with the first exposure time, and the at least one infrared light image may be captured using the infrared light sensor. For example, the visible light image and the at least one infrared light image may be captured at a same time point, in a same period, or in two different periods at least partially overlapped with each other. The at least one infrared light image may include a single infrared light image or at least two infrared light images. More descriptions regarding the capturing of the visible light image and the at least one infrared light image may be found elsewhere in the present disclosure. See, e.g., operation 502 in FIG. 5 and relevant descriptions thereof.

The WDR image generation module 430 may be configured to generate a WDR image by processing the at least one infrared light image. In some embodiments, the at least one infrared light image may be a single infrared light image. The processing device 112 may generate the WDR image by processing the infrared light image based on a dynamic range of the infrared light image. Alternatively, the at least one infrared light image may include at least two infrared light images. The processing device 112 may generate the WDR image of the scene by combining the at least two infrared light images. More descriptions regarding the generation of the WDR image may be found elsewhere in the present disclosure. See, e.g., operation 503 in FIG. 5 and relevant descriptions thereof. In some embodiments, the WDR image generation module 430 may also be referred to as a processing module.

The target image generation module 440 may be configured to generate a target image of the scene by fusing the visible light image and the WDR image. In some embodiments, the target generation module 440 may divide the visible light image into a plurality of first blocks and divide the WDR image into a plurality of second blocks. The target generation module 440 may further generate the target image by fusing the first blocks and the second blocks. In some embodiments, the target generation module 440 may generate the target image by fusing the visible light image and the WDR image based on one or more fusing parameters. More descriptions regarding the generation of the target image may be found elsewhere in the present disclosure. See, e.g., operation 504 in FIG. 5 and relevant descriptions thereof. In some embodiments, the target image generation module 440 may also be referred to as a fusion module.

The modules may be hardware circuits of all or part of the processing device 112. The modules may also be implemented as an application or set of instructions read and executed by the processing device 112. Further, the modules may be any combination of the hardware circuits and the application/instructions. For example, the modules may be the part of the processing device 112 when the processing device 112 is executing the application/set of instructions. The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above descriptions of the processing devices 112 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more of the modules mentioned above may be omitted. For example, the actuation module 420 may be omitted. In some embodiments, two or more of the modules may be combined into a single module, and any one of the modules may be divided into two or more units. For example, the determination module 410 and the actuation module 420 may be integrated into a single module. In some embodiments, the processing device 112 may further include one or more additional modules, such as a storage module.

FIG. 5 is a flowchart illustrating an exemplary process for generating a target image of a scene according to some embodiments of the present disclosure. In some embodiments, process 500 may be executed by the image acquisition system 100. For example, the process 500 may be implemented as a set of instructions (e.g., an application) stored in a storage device (e.g., the storage device 140, the storage 203, and the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 500.

In 501, the processing device 112 (e.g., the determination module 410) (e.g., the processing circuits of the processor 201) may determine a first exposure time of a visible light sensor of an image acquisition device (e.g., the image acquisition device 130) according to ambient light at a scene to be photographed.

As used herein, the ambient light may refer to a source of light in the scene to be photographed. The ambient light may be available naturally and/or supplied by a user for the purpose of taking image data (e.g., one or more images, a video). The ambient light may include infrared light and visible light.

The image acquisition device may be and/or include any suitable device that is capable of acquiring image data of the scene. The image acquisition device may include an infrared light sensor for sensing the infrared light of the ambient light and the visible light sensor for sensing the visible light of the ambient light. In some embodiments, both the infrared light sensor and the visible light sensor may be used to capture image data of the scene. The quality of the image data captured by the visible light sensor may be affected by a brightness of the ambient light. For example, if the brightness of the ambient light is low (e.g., lower than a threshold brightness) (e.g., when at night or in a dark imaging scenario), the image data captured by the visible light sensor may have limited information (e.g., brightness information, color information) related to the scene. The quality of the image data captured by the visible light sensor may be improved by providing a suitable exposure time of the visible light sensor. For example, in a dark imaging scenario, the visible light sensor may obtain more color information related to the scene if the visible light sensor operates with a long exposure time (e.g., an exposure time longer than a threshold time). However, the image data captured by the visible light sensor may be likely to have a smear if the visible light sensor operates with the long exposure time. As such, it is necessary to determine the exposure time for the visible light sensor according to the brightness of the ambient light. The exposure time of the visible light sensor determined according to the brightness of the ambient light may also be referred to as the first exposure time.

In some embodiments, the processing device 112 may determine the brightness of the ambient light based on one or more operation values of one or more exposure parameters of the image acquisition device. The processing device 112 may further determine the first exposure time based on the brightness of the ambient light. More descriptions regarding the determination of the first exposure time may be found elsewhere in the present disclosure. See, e.g., FIG. 6 and relevant descriptions thereof.

In some embodiments, compared with the visible light, the transmission of the infrared light may be less influenced by weather (e.g., fog) and time (e.g., when at night). Optionally, the image acquisition device may actuate an infrared light source (e.g., an infrared light lamp) to provide infrared light in a certain imaging scenario, for example, when at night. The processing device 112 may obtain a default exposure time (e.g., 30 milliseconds, 40 milliseconds, or 50 milliseconds) of the infrared light sensor, and designate the default exposure time as the exposure time of the infrared light sensor. Alternatively, the processing device 112 may determine the exposure time of the infrared light sensor according to actual situations. For example, the processing device 112 may determine a higher exposure time than the default exposure time for the infrared light sensor if the brightness of the infrared light source is insufficient (e.g., lower than a threshold brightness) and/or if the scene to be photographed is too far away from the image acquisition device (e.g., a distance to the image acquisition device is greater a threshold distance, such as 100 meters, 200 meters, 300 meters, or 500 meters).

In 502, the processing device 112 (e.g., the actuation module 420) (e.g., the interface circuits of the processor 201) may actuate the image acquisition device to simultaneously capture a visible light image and at least one infrared light image of the scene, wherein the visible light image may be captured using the visible light sensor with the first exposure time, and the at least one infrared light image may be captured using the infrared light sensor.

As used herein, two images may be regarded as being simultaneously captured if the two images are captured at a same time point (or two substantially same time points), in a same period (or two substantially same time periods), or in two different periods at least partially overlapped with each other. In some embodiments, the visible light sensor and the infrared light sensor may have their respective fields of view (FOVs), and produce the visible light image and at least one infrared light image of their respective FOVs. In some embodiments, the visible light sensor and the visible light sensor may have the same perspective or different perspectives.

In some embodiments, the at least one infrared light image may include one infrared light image. The infrared light sensor may capture the infrared light image with the exposure time of the infrared light sensor as described in connection with operation 501. For example, the infrared light sensor may capture the infrared light image with a default exposure time or an exposure time of the infrared light sensor determined by the processing device 112.

In some embodiments, the at least one infrared light image may include at least two infrared light images. The at least two infrared light images may be captured using the infrared light sensor with at least two different second exposure times. The count (or number) of the at least two infrared light images may be equal to, for example, 2, 3, 4, or any suitable positive value. For illustration purposes, an example of two infrared light images (including a first infrared light image and a second infrared light image) is described hereinafter. The first and second infrared light images may be captured using the infrared light sensor with an exposure time T1 and an exposure time T2 different from T1, respectively. In some embodiments, the sum of T1 and T2 may be equal to, for example, the default exposure time or the determined exposure time of the infrared light sensor as described above. Additionally or alternatively, a ratio of T1 to T2 may be equal to a predetermined value. The predetermined value may be, for example, 3, 5, 9, 10, etc. Merely by way of example, the sum of T1 and T2 may be equal to 40 milliseconds, and a ratio of T1 to T2 may be equal to 9. In this case, T1 may be equal to 36 milliseconds, and T2 may be equal to 4 milliseconds. The first infrared light image, captured with a relatively longer exposure time, may capture more detail information (e.g., edge information, texture information) of one or more object in a dark environment than the second infrared light image. The second infrared light image, captured with a relatively shorter exposure time, may be less likely to be overexposed than the first infrared light image. Compared with taking a single infrared light image with the default exposure time or the determined exposure time of the infrared light sensor, taking the first and second infrared light images may obtain more comprehensive information related to the scene.

In 503, the processing device 112 (e.g., the WDR image generation module 430) (e.g., the processing circuits of the processor 201) may generate a WDR image by processing the at least one infrared light image.

As used herein, a dynamic range of an image may reflect a brightness variation of a plurality of pixels in the image. For example, the dynamic range of the image may be measured by a ratio of the highest brightness of the pixels in the image to the lowest brightness of the pixels in the image. As another example, the dynamic range of the image may be measured by a logarithm of the ratio of the highest brightness to the lowest brightness. In some embodiments, the dynamic range of an image may have an effect on the imaging quality of the image. For example, if the dynamic range of the image is too low (e.g., lower than a threshold), the image may be unclear. As another example, if the dynamic range of the image is too high (e.g., higher than a threshold), the image may be likely to have a part which is too bright and/or a part which is too dark.

Therefore, it is desirable to generate an infrared light image having a suitable dynamic range based on the at least one infrared light image, thereby improving image quality. The infrared light image having the suitable dynamic range may be referred to as the WDR image herein. The suitable dynamic range may be, for example, a dynamic range greater than a threshold A, a dynamic range smaller than a threshold B, a dynamic range within a specific range, etc. The suitable dynamic range (e.g., the threshold A, the threshold B, and/or the specific range) may be a default setting of the image acquisition system 100 or be input by a user of the image acquisition system 100. Alternatively, the suitable dynamic range may be determined by the processing device 112 according to different situations.

In some embodiments, the at least one infrared light image may be a single infrared light image as described in connection with 502. The processing device 112 may generate the WDR image by processing the infrared light image based on the dynamic range of the infrared light image. In some embodiments, the processing device 112 may determine whether the dynamic range of the infrared light image satisfies a predetermined condition (e.g., being equal to or smaller than the threshold A, being within the specific range). For example, if the dynamic range is equal to or smaller than the threshold A, the processing device 112 may determine that the dynamic range satisfies the predetermined condition. If the dynamic range is greater than the threshold A, the processing device 112 may determine that the dynamic range does not satisfy the predetermined condition. Upon a determination that the dynamic range does not satisfy the predetermined condition, the processing device 112 may designate the infrared light image as the WDR image. Upon a determination that the dynamic range satisfies the predetermined condition, the processing device 112 may generate the WDR image by processing the infrared light image. In some embodiments, the processing device 112 may generate the WDR image according to one or more algorithms for dynamic range adjustment. Exemplary algorithms for dynamic range adjustment may include a Gama correction, a histogram equalization, a grey stretch, a linear enhancement, or the like, or any combination thereof. For example, the processing device 112 may perform a Gama correction on the infrared light image to generate the WDR image. In some embodiments, the WDR image generated based on the single infrared light image may be referred to as a digital WDR image.

In some embodiments, the at least one infrared light image may include at least two infrared light images captured by the infrared light sensor with at least two different second exposure times as described in connection with operation 502. The processing device 112 may generate the WDR image of the scene by combining the at least two infrared light images. In some embodiments, the WDR image generated based on the at least two infrared light images may be referred to as a true WDR image.

In 504, the processing device 112 (e.g., the target image generation module 440) (e.g., the processing circuits of the processor 201) may generate a target image of the scene by fusing the visible light image and the WDR image.

In some embodiments, in some imaging sceneries (e.g., at night, in a dark environment, on a foggy day), the visible light sensor and the infrared light sensor may be used to acquire image data of the scene simultaneously. The visible light sensor may acquire more color information than the infrared light sensor. The infrared light sensor may acquire more detail information (e.g., an edge, a shape, and/or a texture of an object) of the scene than the visible light sensor. The target image, which is generated by fusing the visible light image and the WDR image, may include both color information and detail information of the scene, thus having an improved imaging quality.

In some embodiments, the processing device 112 may fuse the visible image and the WDR image to generate the target image according to an image fusion algorithm. Exemplary image fusion algorithms may include a Pyramid transformation algorithm, a Wavelet transformation algorithm, a Nonsubsampled contourlet transformation algorithm, an Edge-preserving filtering algorithm, a curvelet transformation algorithm, a framelet transformation algorithm, a shearlet transformation algorithm, a tetrolet transformation algorithm, a top-hat transformation algorithm, a discrete cosine transformation algorithm, a directionlets transformation algorithm, an empirical mode decomposition, an internal generative mechanism, a multi-resolution singular value decomposition (SVD) algorithm, or the like, or any combination thereof.

In some embodiments, the processing device 112 may divide the visible light image into a plurality of first blocks and divide the WDR image into a plurality of second blocks. In certain embodiments, the processing device 112 may divide the visible light image and the WDR image according to a division rule and/or a division parameter. For example, the visible light image may be evenly divided into the first blocks, each of which has a preset size and/or a preset shape. The WDR may be divided into the second blocks in the same manner as the visible light image. The processing device 112 may further compare the first blocks and the second blocks to generate a comparison result. In some embodiments, the processing device 112 may compare each first block in the visible light image with a corresponding second block in the WDR image. A second block corresponding to a first block may refer to a second block whose position in the WDR image is the same (or substantially same) as the position of the first block in the visible light image. The comparison of a first block and a corresponding second block may include, for example, a comparison regarding color information of the first and second blocks, a comparison regarding an imaging entropy of the first and second blocks, a comparison regarding detail information of the first and second blocks, a comparison regarding the resolutions of the first and second blocks, or the like, or any combination thereof. The color information of a block may include, for example, luminance information (e.g., a luminance component), saturation information (e.g., a saturation component), hue information (e.g., a hue component) of the block, or the like, or any combination thereof. The detail information of a block may include, for example, edge information, shape information, texture information of the block, or the like, or any combination thereof. In some embodiments, the compassion of a first block and a corresponding second block may include a comparison regarding color information of the two blocks if the brightness (e.g., an average brightness) of the first block and/or the second block is greater a threshold brightness. Additionally or alternatively, the compassion of a first block and a corresponding second block may include a comparison regarding detail information of the two blocks if the brightness (e.g., an average brightness) of the first block and/or the second block is below the threshold brightness.

Then the processing device 112 may fuse the visible light image and the WDR image based on the comparison result. For example, for each first block and the corresponding second block, the processing device 112 may select a block has more color information (or detail information) among the first and second blocks as a block in the target image. As another example, the processing device 112 may assign a weight to each of the first and second blocks according to the color information and/or the detail information of the first and second blocks. The processing device 112 may further generate the target image by fusing the first blocks and the second blocks according to the weights of the first blocks and the second blocks. In some embodiment, the processing device 112 may determine one or more fusing parameters based on the visible light image and the WDR image. The processing device 112 may further generate the target image of the scene by fusing the visible light image and the WDR image based on the fusing parameter(s). In some embodiments, the fusing parameter(s) may include an estimated brightness of the target image, an estimated saturation of the target image, an estimated noise ratio of the target image, or the like, or any combination thereof. In some embodiments, the processing device 112 may determine color information and/or detail information of the visible light image (or the first blocks of the visible light image) and the WDR image (or the second blocks of the WDR image). For example, the processing device 112 may determine a luminance component and/or a saturation component of the visible light image (or the first blocks) and the WDR image (or the second blocks). The processing device 112 may assign a first weight to the luminance component of the visible light image (or the first blocks) and a second weight to the luminance component of the WDR image (or the second blocks). The processing device 112 may determine a luminance component of the target image based on the first weight and the second weight, for example, by summing the luminance components of the visible light image (or the first blocks) and the WDR image (or the second blocks) according to the first weight and the second weight.

In some embodiments, before fusing the visible light image and the WDR image, the processing device 112 may preprocess the visible light image and the WDR image. The processing device 112 may generate the target image of the scene by fusing the preprocessed visible light image and the preprocessed WDR image. The preprocessing of the visible light image and the WDR image may include an image registration, an image denoising, a bright light suppression, an image compensation, an image segmentation, a color enhancement, a shadow elimination, an image filtering, an image correction (e.g., defect correction, gamma correction, and geometric distortion correction), or the like, or any combination thereof. The preprocessing of the visible light image and the WDR image may improve the quality of the target image.

In some embodiments, the FOVs of the visible light sensor and the infrared light sensor may be different as described above, the visible light image and the WDR image may need to be registered such that visible light image and the WDR image match each other. For example, the image registration may be performed according to an image registration algorithm, such as but not limited to an intensity-based registration algorithm, a transformation model-based registration algorithm, a spatial registration algorithm, a point-based registration algorithm, a surface-based registration algorithm, or the like, or any combination thereof.

It should be noted that the above description of the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations herein discussed. Additionally, the order of the process 500 may not be intended to be limiting. For example, operation 501 may be omitted. The image acquisition device may be directly actuated to simultaneously capture a visible light image and at least one infrared light image when, for example, the image acquisition device is in a certain imaging scenario (e.g., at night, in a dark environment). The visible light image may be captured by the visible light sensor using a predetermined exposure time (e.g., a default exposure time, an exposure time longer than a threshold). The at least one infrared light image may be captured using the infrared light sensor. In some embodiments, the process 500 may be automatically performed when one or more certain conditions are met, for example, in a certain time period or on a day having a certain type of weather.

Figure 6:
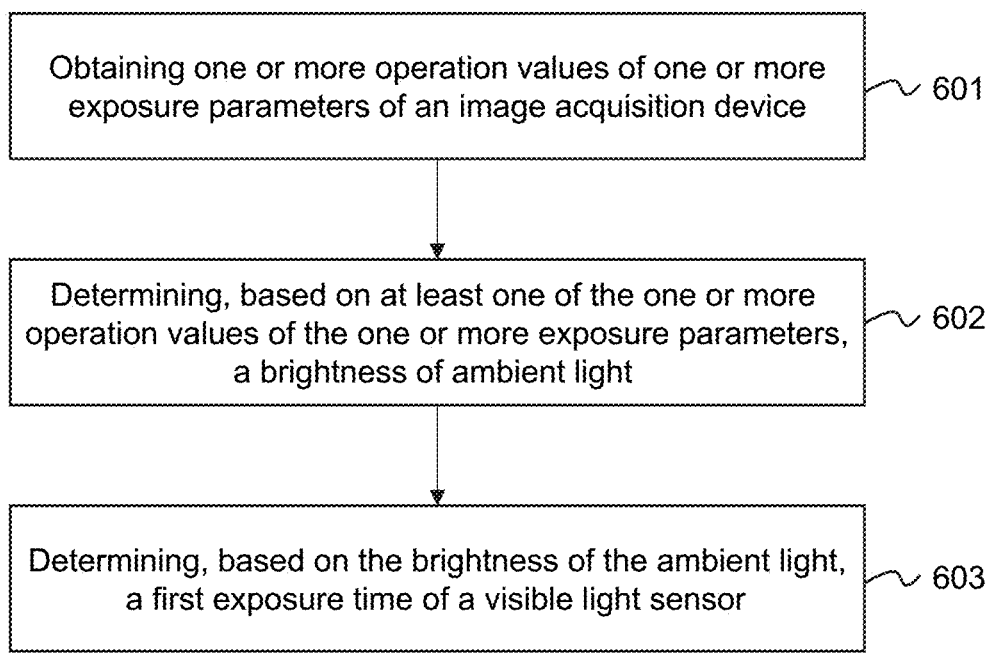
FIG. 6 is a flowchart of another exemplary process for determining a first exposure time of a visible light sensor according to some embodiments of the present disclosure.

FIG. 6 is a flowchart illustrating an exemplary process for determining a first exposure time of a visible light sensor according to some embodiments of the present disclosure. In some embodiments, process 600 may be executed by the image acquisition system 100. For example, the process 600 may be implemented as a set of instructions (e.g., an application) stored in a storage device (e.g., the storage device 140, the storage 203, and the storage 390). In some embodiments, the processing device 112 (e.g., the processor 201 of the computing device 200, the CPU 340 of the mobile device 300, and/or one or more modules illustrated in FIG. 4) may execute the set of instructions and may accordingly be directed to perform the process 600. In some embodiments, one or more operations of the process 600 may be performed to achieve at least part of operation 501 as described in connection with FIG. 5.

In 601, the processing device 112 (e.g., the determination module) (e.g., the processing circuits of the processor 201) may obtain one or more operation values of one or more exposure parameters of the image acquisition device.

In some embodiments, the operation value(s) of the exposure parameter(s) may be adjusted automatically if the image acquisition device operates in an automatic exposure mode. Thus the operation value(s) of the exposure parameter(s) may reflect a light environment (e.g., the brightness of the ambient light) in the scene to be photographed. Exemplary exposure parameters of the image acquisition device may include a shutter speed, an aperture size, a gain, a screen brightness, an image brightness, or the like, or a combination thereof. In some embodiments, the operation value of the shutter speed may be a real-time shutter speed of the image acquisition device at the present moment or at a defined time reasonably close to the present moment. Alternatively, the operation value of the shutter speed may be a statistical shutter speed of the image acquisition device, for example, an average shutter speed of the image acquisition device in a historical period (e.g., the last 30 seconds, the last minute). Alternatively, the operation value of the shutter speed may be a target shutter speed, which may be determined based on the scene so as to achieve a high or desirable imaging quality. Similarly, the operation value of the aperture size may be a real-time aperture size, a statistical aperture size, or a target aperture size. The operation value of the gain may be a real-time gain, a statistical gain, or a target gain. The operation value of the screen brightness may be a real-time screen brightness, a statistical screen brightness, or a target screen brightness.

The image brightness may refer to a brightness of one or more images (or frames) captured by the image acquisition device. For example, the image brightness may be a real-time brightness of an image (or a frame) captured by the image acquisition device at the present moment or at a defined time reasonably close to the present moment. A brightness of an image (or a frame) may be, for example, an average brightness, a median brightness, a maximum brightness of a plurality of pixels of the image (or the frame). Alternatively, the image brightness may be a statistical brightness of a plurality of images (or frames), for example, an average brightness of a plurality of images (or frames) captured by the image acquisition device in a historical period (e.g., the last 30 seconds, the last minute). Alternatively, the image brightness may be a target brightness, which may be determined based on the scene to be photographed to achieve a high or desirable imaging quality. In some embodiments, the processing device 112 may determine the operation value(s) of the exposure parameter(s) based on one or more image filters.

In 602, the processing device 112 (e.g., the determination module 410) (e.g., the processing circuits of the processor 201) may determine the brightness of the ambient light based on at least one of the operation value(s) of the exposure parameter(s).

The brightness of the ambient light may be represented by a numerical value, a brightness level, or the like. For example, the brightness may be classified into a plurality of brightness levels, e.g., an ultralow level of brightness (e.g., a level at which the brightness is lower than a first threshold brightness), a low level of brightness (e.g., a level at which the brightness is equal to or greater than the first threshold brightness and lower than a second threshold brightness), and a sufficient level of brightness (e.g., a level at which the brightness is equal to or greater than the second threshold brightness). The first threshold brightness and the second threshold brightness may be any suitable values, and the first threshold brightness may be smaller than the second threshold brightness.

In some embodiments, the processing device 112 may determine the brightness of the ambient light based on the operation value of one exposure parameter. Take the gain as an example, the processing device 112 may obtain a first relationship between values of the gain and values of the brightness of the ambient light. For example, the first relationship may be described in the form of a correlation function, or be presented in the form of a table or curve recording different values (or ranges) of the gain and their corresponding values (or ranges) of the brightness of the ambient light. Merely by way of an example, the first relationship may specify that the ambient light has the ultralow level of brightness if the value of the gain is equal to or greater than a first threshold gain, that the ambient light has the low level of brightness if the value of the gain is smaller than the first threshold gain and equal to or greater than a second threshold gain, and that the ambient light has the sufficient level of brightness if the value of the gain is lower than the second threshold gain. The first threshold gain and the second threshold gain may be any suitable values, and the second threshold gain may be smaller than the first threshold gain. For example, the first threshold gain may be 45 dB, 42 dB, 40 dB, or the like. The second threshold gain may be 35 dB, 30 dB, 28 dB, or the like. The processing device 112 may determine the value of the brightness of the ambient light based on the operation value of the gain of the image acquisition device and the first relationship. For example, the processing device 112 may input the operation value of the gain into the correlation function to determine the brightness of the ambient light. As another example, the processing device 112 may determine the brightness of the ambient light by looking up the table or consulting the curve.

In some embodiments, the processing device 112 may determine the brightness of the ambient light based on the operation values of two or more exposure parameters. Merely by way of an example, the processing device 112 may obtain a second relationship between values of the two or more exposure parameters and values of the brightness of the ambient light. Similar as the first relationship, the second relationship may be described in the form of a correlation function, or be presented in the form of a table or curve recording different values (or ranges) of the two or more exposure parameters and their corresponding values (or ranges) of the brightness of the ambient light. The processing device 112 may further determine the brightness of the ambient light based on the second relationship and the operation values of the two or more exposure parameters.

In 603, the processing device 112 (e.g., the determination module 410) (e.g., the processing circuits of the processor 201) may determine the first exposure time of the visible light sensor based on the brightness of the ambient light.

In some embodiments, the processing device 112 may obtain a third relationship between values of the brightness of the ambient light and values of the first exposure time. The third relationship may be represented by a mapping table recording different values (or ranges) of the brightness of the ambient light and their corresponding values of the first exposure time, or be described in the form of a correlation function between the brightness of the ambient light and the first exposure time. In some embodiments, the third relationship may be pre-determined and stored in a storage device of the image acquisition system 100 or an external source. The processing device 112 may obtain the third relationship from the storage device or the external source. The processing device 112 may further determine the first exposure time by, for example, looking up the mapping table or solving the correlation function between the brightness of the ambient light and the first exposure time.

It should be noted that the above description of the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may be accomplished with one or more additional operations not described and/or without one or more of the operations herein discussed. Additionally, the order of the process 600 may not be intended to be limiting. For example, operations 601 and 602 may be integrated into a single operation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An imaging acquisition system, comprising:
   an image acquisition device including a visible light sensor for sensing visible light and an infrared light sensor for sensing infrared light;
   at least one storage medium including a set of instructions; and
   at least one processor in communication with the at least one storage medium and the image acquisition device, wherein when executing the instructions, the at least one processor is configured to direct the system to perform operations including:
      determining a first exposure time of the visible light sensor according to ambient light at a scene to be photographed;
      actuating the image acquisition device to simultaneously capture a visible light image and at least one infrared light image of the scene, wherein the visible light image is captured using the visible light sensor with the first exposure time, and the at least one infrared light image is captured using the infrared light sensor;
      generating a wide dynamic range (WDR) image by processing the at least one infrared light image; and
      generating a target image of the scene by fusing the visible light image and the WDR image.

2. The system of claim 1, wherein the at least one infrared light image is one infrared light image, and to generate the WDR image by processing the infrared light image, the at least one processor is further configured to direct the system to perform additional operations including:
   determining a dynamic range of the infrared light image;
   determining whether the dynamic range satisfies a predetermined condition; and
   upon a determination that the dynamic range satisfies the predetermined condition, generating the WDR image by processing the infrared light image.

3. The system of claim 2, wherein the at least one processor is further configured to direct the system to perform additional operations including:
   upon a determination that the dynamic range does not satisfy a predetermined condition, designating the infrared light image as the WDR image.

4. The system of claim 1, wherein the at least one infrared light image includes at least two infrared light images, the at least two infrared light images are captured using the infrared light sensor with at least two different second exposure times, and to generate the WDR image by processing the at least two infrared light images, the at least one processor is further configured to direct the system to perform additional operations including:
   generating the WDR image by combining the at least two infrared light images.

5. The system of claim 1, wherein to determine the first exposure time of the visible light sensor according to the ambient light at the scene to be photographed, the at least one processor is further configured to direct the system to perform additional operations including:
   obtaining one or more operation values of one or more exposure parameters of the image acquisition device;
   determining, based on at least one of the one or more operation values of the one or more exposure parameters, a brightness of the ambient light; and
   determining, based on the brightness of the ambient light, the first exposure time of the visible light sensor.

6. The system of claim 1, wherein to generate the target image of the scene by fusing the visible light image and the WDR image, the at least one processor is further configured to direct the system to perform additional operations including:
   dividing the visible light image into a plurality of first blocks;
   dividing the WDR image into a plurality of second blocks;
   comparing the plurality of first blocks and the plurality of second blocks to generate a comparison result; and
   fusing, based on the comparison result, the visible light image and the WDR image.

7. The system of claim 1, wherein to generate the target image of the scene by fusing the visible light image and the WDR image, the at least one processor is further configured to direct the system to perform additional operations including:
   determining, based on the visible light image and the WDR image, one or more fusing parameters; and
   generating the target image of the scene by fusing the visible light image and the WDR image according to the one or more fusing parameters.

8. The system of claim 1, wherein to generate a target image of the scene by fusing the visible light image and the WDR image, the at least one processor is further configured to direct the system to perform additional operations including:
   preprocessing the visible light image and the WDR image; and
   generating the target image of the scene by fusing the preprocessed visible light image and the preprocessed WDR image.

9. The system of claim 8, wherein the preprocessing of the visible light image and the WDR image comprises at least one of an image registration, an image denoising, a bright light suppression, an image compensation, an image segmentation, a color enhancement, a shadow elimination, an image filtering, or an image correction.

10. A method for image acquisition using an image acquisition device, the image acquisition device including a visible light sensor for sensing visible light and an infrared light sensor for sensing infrared light, the method comprising:
determining a first exposure time of the visible light sensor according to ambient light at a scene to be photographed;
actuating the image acquisition device to simultaneously capture a visible light image and at least one infrared light image of the scene, wherein the visible light image is captured using the visible light sensor with the first exposure time, and the at least one infrared light image is captured using the infrared light sensor;
generating a wide dynamic range (WDR) image by processing the at least one infrared light image; and
generating a target image of the scene by fusing the visible light image and the WDR image.

11. The method of claim 10, wherein the at least one infrared light image is one infrared light image, and the generating the WDR image by processing the infrared light image comprises:
determining a dynamic range of the infrared light image;
determining whether the dynamic range satisfies a predetermined condition; and
upon a determination that the dynamic range satisfies the predetermined condition, generating the WDR image by processing the infrared light image.

12. The method m of claim 11, wherein the generating the WDR image by processing the infrared light image further comprises:
upon a determination that the dynamic range does not satisfy the predetermined condition, designating the infrared light image as the WDR image.

13. The method of claim 10, wherein the at least one infrared light image includes at least two infrared light images, the at least two infrared light images are captured using the infrared light sensor with at least two different second exposure times, and the generating the WDR image by processing the at least two infrared light images comprises:
generating the WDR image by combining the at least two infrared light images.

14. The method of claim 10, wherein the determining the first exposure time of the visible light sensor according to the ambient light at the scene to be photographed comprises:
obtaining one or more operation values of one or more exposure parameters of the image acquisition device;
determining, based on at least one of the one or more operation values of the one or more exposure parameters, a brightness of the ambient light; and
determining, based on the brightness of the ambient light, the first exposure time of the visible light sensor.

15. The method of claim 10, wherein the generating the target image of the scene by fusing the visible light image and the WDR image comprises:

dividing the visible light image into a plurality of first blocks;
dividing the WDR image into a plurality of second blocks;
comparing the plurality of first blocks and the plurality of second blocks to generate a comparison result; and
fusing, based on the comparison result, the visible light image and the WDR image.

16. The method of claim 10, wherein the generating the target image of the scene by fusing the visible light image and the WDR image comprises:
determining, based on the visible light image and the WDR image, one or more fusing parameters; and
generating the target image of the scene by fusing the visible light image and the WDR image according to the one or more fusing parameters.

17. The method of claim 10, wherein the generating a target image of the scene by fusing the visible light image and the WDR image comprises:
preprocessing the visible light image and the WDR image; and
generating the target image of the scene by fusing the preprocessed visible light image and the preprocessed WDR image.

18. The method of claim 17, wherein the preprocessing of the visible light image and the WDR image comprises at least one of an image registration, an image denoising, a bright light suppression, an image compensation, an image segmentation, a color enhancement, a shadow elimination, an image filtering, or an image correction.

19. A non-transitory computer-readable storage medium including instructions that, when accessed by at least one processor of a computing device, causes the computing device to:
determining a first exposure time of a visible light sensor of an image acquisition device according to ambient light at a scene to be photographed, the image acquisition device including the visible light sensor for sensing visible light and an infrared light sensor for sensing infrared light;
actuating the image acquisition device to simultaneously capture a visible light image and at least one infrared light image of the scene, wherein the visible light image is captured using the visible light sensor with the first exposure time, and the at least one infrared light image is captured using the infrared light sensor;
generating a wide dynamic range (WDR) image by processing the at least one infrared light image; and
generating a target image of the scene by fusing the visible light image and the WDR image.

20. The non-transitory computer-readable storage medium of claim 19, wherein the at least one infrared light image is one infrared light image, and the generating the WDR image by processing the infrared light image comprises:
determining a dynamic range of the infrared light image;
determining whether the dynamic range satisfies a predetermined condition; and
upon a determination that the dynamic range satisfies the predetermined condition, generating the WDR image by processing the infrared light image.

* * * * *